US008432849B2

(12) United States Patent
Krishnasawamy et al.

(10) Patent No.: US 8,432,849 B2
(45) Date of Patent: Apr. 30, 2013

(54) WIRELESS SYSTEM PERFORMANCE MODELING

(75) Inventors: Dilip Krishnasawamy, San Diego, CA (US); Eugene P. Matter, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1251 days.

(21) Appl. No.: 11/240,021

(22) Filed: Sep. 30, 2005

(65) Prior Publication Data

US 2007/0086529 A1   Apr. 19, 2007

(51) Int. Cl.
*H04B 7/185* (2006.01)

(52) U.S. Cl.
USPC .... 370/317; 370/241; 370/395.53; 455/67.14

(58) Field of Classification Search ................ 370/241, 370/317, 395.53; 455/67.14
See application file for complete search history.

(56) References Cited

U.S. PATENT DOCUMENTS

| 6,038,609 | A  | * | 3/2000 | Geulen ......................... 709/250 |
| 7,453,966 | B2 | * | 11/2008 | Tang et al. .................... 375/348 |
| 2005/0054296 | A1 | * | 3/2005 | Chuang et al. ............... 455/63.1 |

OTHER PUBLICATIONS

Krishnaswamy, et al, Adaptive Modulated Scalable Video Transmission Over Wireless Networks with a Game Theoretic Approach, IT@Intel REsearch, Folsom, CA, USA, 4 pages.
Krishnaswamy, et al, Game Theoretic Formulations for Network-assisted Resource Management in Wireless Networks, Wireless Communications and Computing Group, Intel Corporation, Folsom, CA, USA, 5 pgs.

* cited by examiner

*Primary Examiner* — Justin Lee
(74) *Attorney, Agent, or Firm* — Pillsbury Winthrop Shaw Pittman LLP

(57) ABSTRACT

An arrangement is provided for modeling the performance of a communication network. One or two sigmoid functions may be used to model the performance of a physical layer versus the SINR of a transmission channel across all of the available modulation and coding schemes. The sigmoid function(s) abstract(s) away all of the available modulation and coding choices to provide an estimate for the PHY throughput. This estimate can then be utilized by higher network layers to obtain the network throughput at the application level, which may then be used to produce a data stream by an application source. Based on the data stream thus produced, the quality of information to be transmitted via a channel, when received, may be estimated.

17 Claims, 10 Drawing Sheets

WIRELESS SYSTEM PERFORMANCE MODELING

BACKGROUND

1. Field

This disclosure relates generally to performance analysis and prediction of a communication network and, more specifically, to wireless network performance modeling.

2. Description

A communication network may be represented by different layers such as physical layer, data link layer, network layer, transport layer, session layer, presentation layer, and application layer. At the bottom of these layers is the physical layer which is the actual hardware used for data transmission. A physical layer of a communication network, especially a wireless network, allows a choice from many different modulation and coding schemes that could be used for data transmission over a channel (e.g., a wireless medium). The physical layer performance depends on the modulation and coding scheme chosen for data transmission at a given condition of the channel (e.g., signal to interference plus noise ratio ("SINR")). The physical layer performance may be represented by its throughput. Given the myriad of choices of modulation and coding schemes, it is typically difficult to predict an approximate value of the expected physical layer throughput for a given channel condition. Traditionally, the current choice of the modulation and coding scheme ("MCS") is used to reflect the instantaneous physical layer throughput. As channel conditions dynamically change causing the SINR to change, the current choice of the MCS is not a true reflection of expected physical layer throughput for the given channel conditions. There are fine-grain fluctuations in performance due to link adaptation, and there are also coarse-grain variations in the overall perceived throughput as channel conditions vary. Thus, it is desirable to have the ability to model, and predict variations in throughput as a function of varying channel conditions. In this regard, it is desirable to have an analytic expression for the physical layer throughput as a function of the SINR to provide a more accurate estimate of the expected physical layer throughput based on current channel conditions.

BRIEF DESCRIPTION OF THE DRAWINGS

The features and advantages of the disclosed subject matter will become apparent from the following detailed description of the present disclosure in which.

DETAILED DESCRIPTION

According to an embodiment of techniques disclosed in this application, a sigmoid function may be used to model the performance of a physical layer versus the SINR of a transmission channel across different available modulation and coding schemes. For each modulation and coding scheme ("MCS"), the relationship between the physical layer ("PHY") throughput and the SINR of a transmission channel may be represented by a sigmoidal curve, which has an upper knee. The envelope formed by upper knees of different sigmoidal curves may be approximated by the sigmoid function used to model the PHY performance. The sigmoid function abstracts away the modulation and coding choices available at the PHY to provide an estimate for the PHY throughput. This estimate can then be utilized by higher network layers without having to worry about lower level details such as choices of modulation and coding schemes. To capture the dependence of variation in channel conditions (such as fading conditions, coherence time, packet size of data to be transmitted over the channel, number of packets aggregated for transmission, and other factors affecting transmission), more than one sigmoid function may be used to model the PHY performance. The plausible variation in performance for a given SINR may be captured by sigmoidal envelopes that encapsulate the possible expected variation in channel conditions for a given SINR, to provide a range of possible PHY throughput for a given SINR.

Reference in the specification to "one embodiment" or "an embodiment" of the disclosed subject matter means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
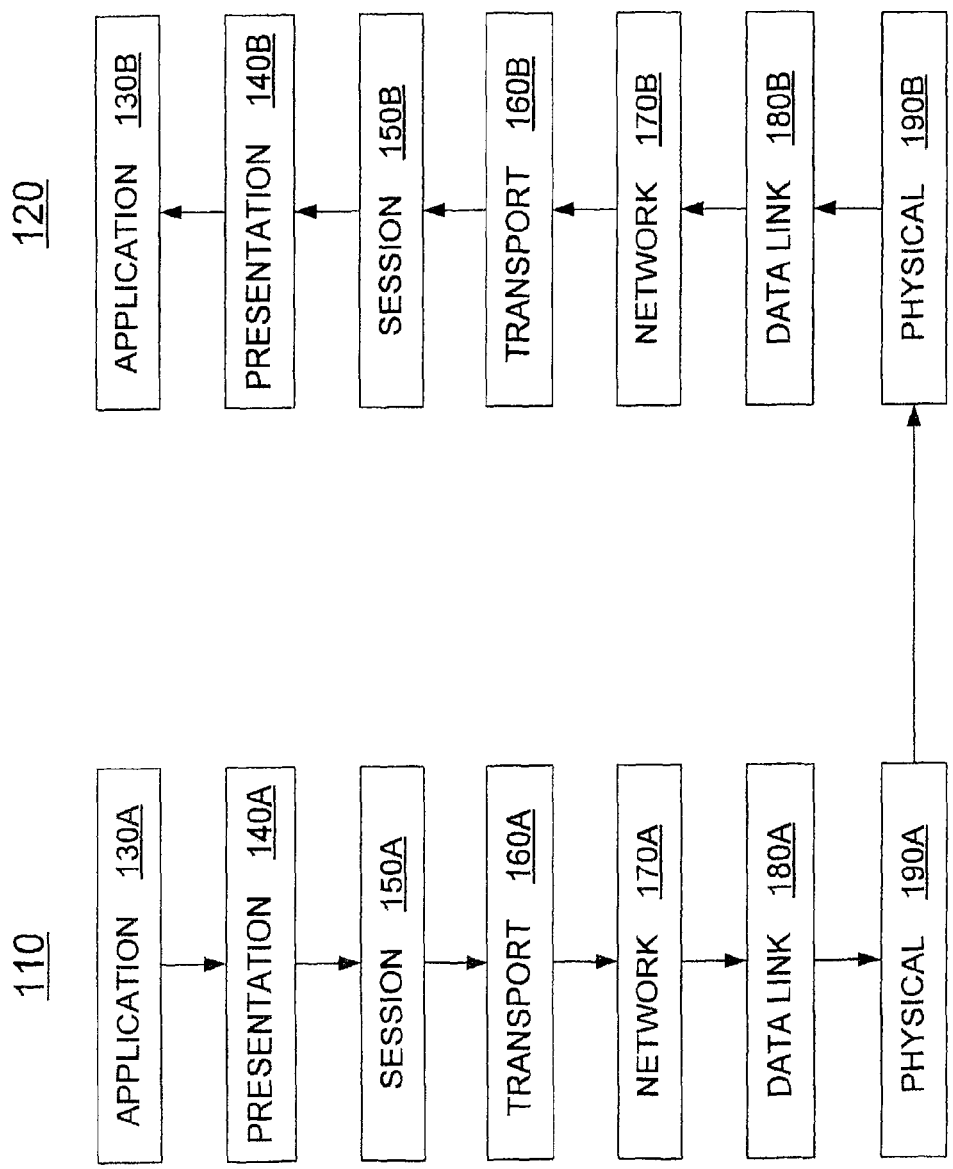
FIG. 1 shows an example layer structure of a communication system.

FIG. 1 shows an example layer structure of a communication system. The layered concept of networking was developed to accommodate changes in technology that may occur in a layer independent of other layers. Each layer of a specific network model may be responsible for a different function of the network. In one example, a network model may comprise seven layers as shown in FIG. 1. Both a sending agent 110 and a receiving agent 120 comprise the same seven layers from bottom to top: physical layer (190A and 190B), data link layer (180A and 180B), network layer (170A and 170B), transport layer (160A and 160B), session layer (150A and 150B), presentation layer (140A and 140B), and application layer (130A and 130B). Each layer will pass information up and down to the next subsequent layer as data is processed.

A physical layer comprises actual hardware used to transmit data either via wire or wirelessly. A data link layer provides a data transfer method. The data link layer puts data in frames and provides support for error-free transmission using redundant information such as cyclic redundancy checks and/or frame check sequences ("CRC/FCS"). It also controls the timing of the network transmission and adds frame type, address, and error control information. The data link layer may be further divided into a logical link control sublayer ("LLC") and a media access control sublayer ("MAC"). An LLC maintains the link between a sending agent and a receiving agent by establishing Service Access Points ("SAPs"), which are a series of interface points. An MAC is used to coordinate the sending of data between agents. A network layer provides IP network protocol. The network layer routes messages using the best path available. A reliable transport layer protocol such as Transmission Control Protocol ("TCP") ensures properly sequenced and error-free transmission. However, a simpler unreliable transport protocol such as User Datagram Protocol ("UDP") provides no such guarantees.

A session layer provides an interface between a user and the network. The session layer determines when the session is begun or opened, how long it is used, and when it is closed. It also controls the transmission of data during the session, and supports security and name lookup enabling agents in the network to locate each other. A presentation layer makes the type of data transparent to the layers around it. The presentation layer is used to translate data into agent specific formats which may include specific byte ordering or compression techniques. It prepares the data, either for the network layer or the application layer, depending on the direction it is going. An application layer provides services software applications need. The application layer provides the ability for user applications to interact with the network. Many protocol stacks overlap the borders of the seven layer model by operating at multiple layers of the model. For example, file transport protocol ("FTP") and telnet both work at the application, presentation, and the session layers.

When a user application needs to send data from one agent to another, it is desirable for the application to know in advance how much bandwidth is available to transmit the data in the network. The application can then scale accordingly to produce a data stream at the sending end with a bit rate less than or equal to the available bandwidth in the network to achieve the best data quality at the receiving end. Typically, the bandwidth capacity of layers higher than the physical layer is more predictable than the bandwidth capacity of the physical layer because the performance of a physical layer depends highly on many factors (e.g., condition of a transmission channel used, the MCS, and packet size) which may be hard to be known in advance and/or varying from time to time. Thus, for a user application to predict the available bandwidth in the network, it is necessary for the application to have a means to estimate the performance of a physical layer.

However, there are many MCS's for a PHY to choose for data transmission. At one value of SINR, the PHY may choose a MCS (e.g., quadrature amplitude modulation ("QAM"), rate ¾ mode); and at another value of SINR, the PHY may choose another MCS (e.g., Quadrature Phase Shift Keying ("QPSK"), rate ½ mode) for more robust data transmission. Under each MCS, the throughput of the PHY varies as the SINR of the transmission channel changes. Thus, for a user application to estimate the throughput of a PHY at a given value of SINR of the transmission channel, it is necessary to consider all possible MCS's that the PHY may choose, how the PHY throughput varies with the channel SINR changing, and other factors (e.g., channel fading conditions, packet size, etc.). From a user application's point of view, it is desirable to use a model to abstract away all these details required to estimate the PHY throughput so that the application can more efficiently predict the throughput of the PHY based on this model.

Modulation schemes that allow more bits per symbol help in increasing data rates; however they have symbols closer to each other and small errors could result in erroneous decoding. Varying code rates can be employed within each modulation scheme to adapt to changing channel conditions by allowing more bits for coding (i.e., lower code rate) for more robust transmission as conditions deteriorate. As the code rate decreases, the effective data rate is reduced, and hence the achievable throughput is also reduced. For a given MCS, m, the probability of error, $P_e^m(L)$, in a packet of length L (L bytes) ($P_e^m(L)$ is also referred to as the PHY packet error rate or PER) may be obtained as follows, $$P_e^m(L) = 1 - (1 - p_b^m)^{8L}, \quad (1)$$

where $p_b^m$ is the bit error probability. The PHY throughput can be then expressed as, $$T_{PHYm}(x) = A(1 - P_e^m(L)), \quad (2)$$

where A is the maximum PHY throughput without any transmission error, and x is the SINR (in dB) of the transmission channel. The effective PHY throughput (in kilo bits per second or kbps) as a function of the SINR of the channel may be approximated with a sigmoid function:

$$T_{PHYm}(x) = A/(1 + e^{-\lambda(x-\delta)}). \quad (3)$$

The sigmoid function has asymptotes y=A, and y=0, and has in inflection point at x=δ. The factors λ and A determine the maximum slope (Aλ/4) of the sigmoid curve at x=δ. The maximum curvature point of $T_{PHYm}(x)$ may be referred to as the upper knee of $T_{PHYm}(x)$, $K_m$ ($K_m$ may be represented by the value of its corresponding SINR).

Figure 2A:
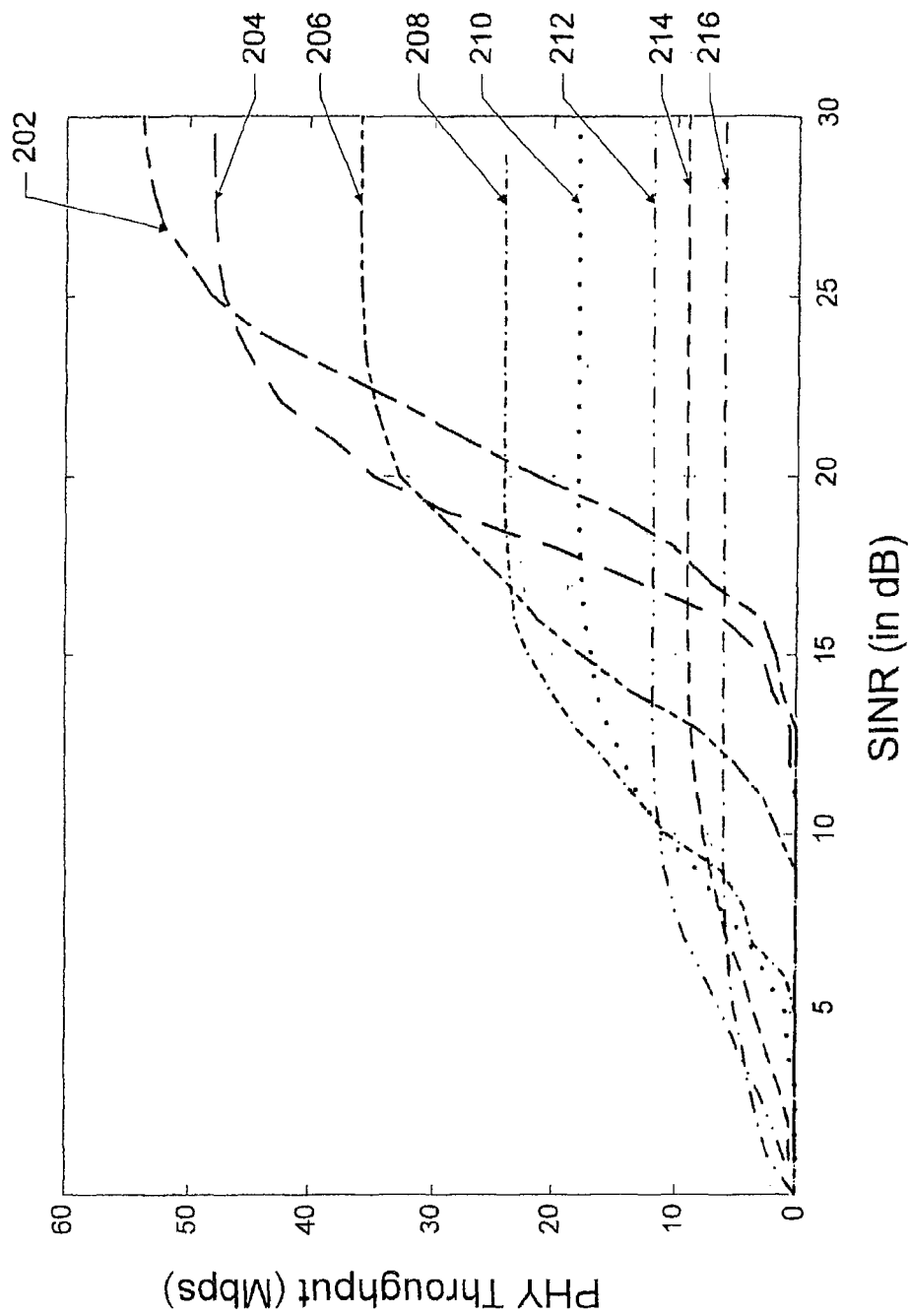
FIGS. 2A-2C illustrate relationships between the performance of a network physical layer, the transmission channel condition, and modulation and coding schemes for data transmission.

FIG. 2A shows example sigmoidal PHY throughput curves obtained with modeling packet transmissions over an 802.11a wireless local area network ("WLAN") as a function of the SINR. A 75 ns exponentially fading channel was used, and 1000 byte packet lengths were used. Curve 202 corresponds to the 64QAM, rate ¾ MCS mode; curve 204 corresponds to the 64QAM, rate 2/3 mode; curve 206 corresponds to the 16QAM, rate ¾ mode; curve 208 corresponds to 16QAM, rate ½ mode; curve 210 corresponds to QPSK, rate ¾ mode; curve 212 corresponds to QPSK, rate ½ mode; curve 214 corresponds to Binary Phase Shift Keying (BPSK), rate ¾ mode; and curve 216 corresponds to BPSK, rate ½ mode. Each curve has an upper knee (e.g., upper knee 218 of curve 202) and three parameters (A, λ, δ). The table below shows values of three parameters (A, λ, δ) and the upper knee of each curve.

| PHY throughput Curve in FIG. 2A | A (Mbps) | δ (dB) | λ (dB⁻¹) | $K_m$ (dB) |
| --- | --- | --- | --- | --- |
| 202 (64QAM. ¾) | 54 | 21.2 | 0.419 | 29.45 |
| 204 (64QAM. ⅔) | 48 | 18.2 | 0.625 | 24.18 |
| 206 (16QAM. ¾) | 36 | 15.1 | 0.352 | 23.27 |
| 208 (16QAM. ½) | 24 | 10.9 | 0.375 | 16.87 |
| 210 (QPSK. ¾) | 18 | 9.3 | 0.444 | 14.76 |
| 212 (QPSK. ½) | 12 | 5.3 | 0.461 | 9.84 |
| 214 (BPSK. ¾) | 9 | 6.1 | 0.417 | 10.40 |
| 216 (BPSK. ½) | 6 | 2.3 | 0.640 | 5.15 |

Figure 2B:
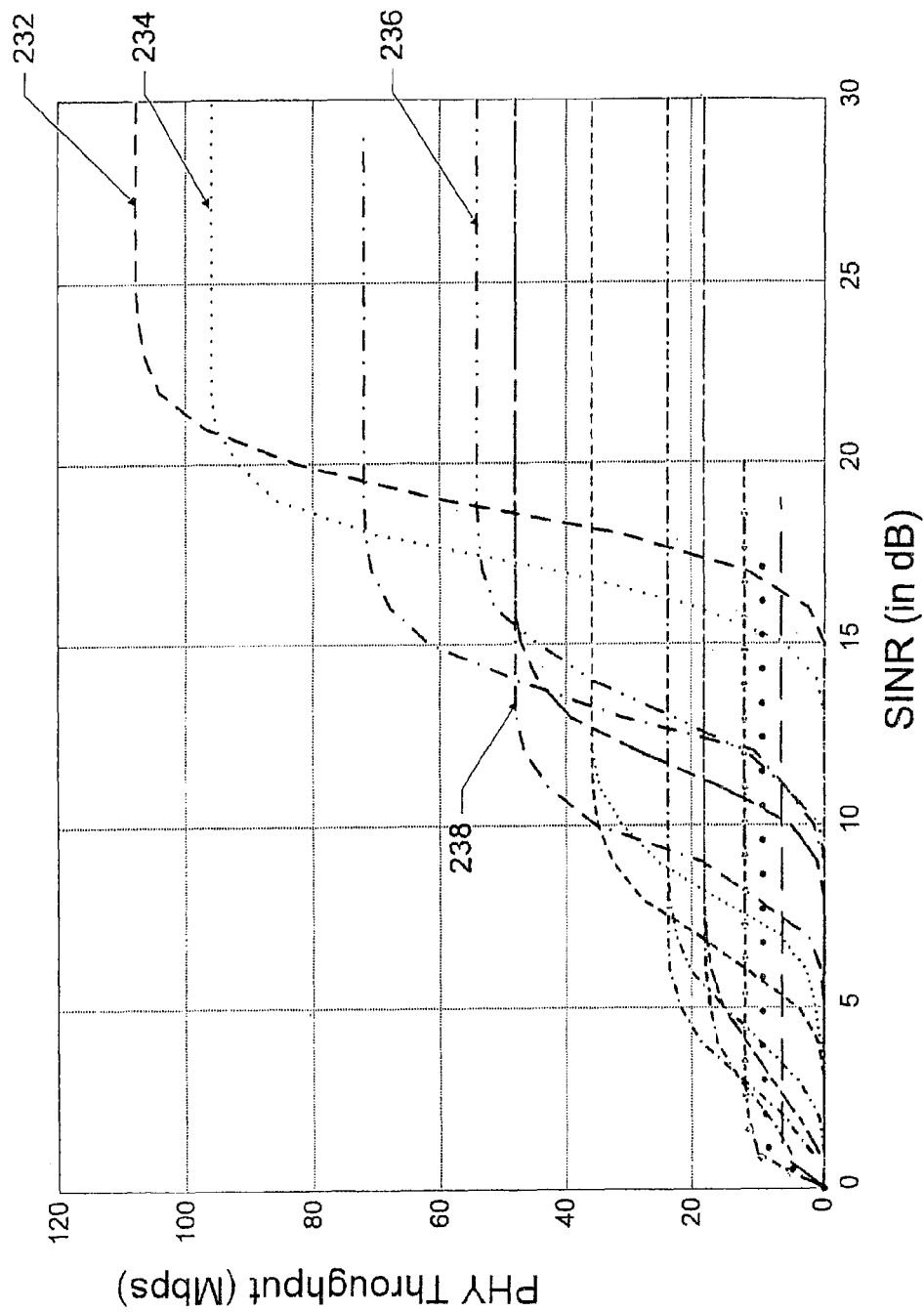

FIG. 2B shows another set of example PHY throughput (in Mega bits per second or Mbps) versus SINR (in dB). Results in the figure are obtained in 2×3 multiple input multiple output ("MIMO") WLAN environment. The use of spatial multiplexing using spatial frequency combining ("SFC") and the use of spatial diversity using cyclic-delay-diversity ("CDD") are compared. For example, curve 232 and curve 236 correspond to 64QAM, ¾ rate, SFC mode and 64 QAM, ⅔ rate, CDD mode, respectively; and curve 234 and curve 238 correspond to 64QAM, ⅔ rate, SFC mode and 64QAM, ⅔ rate, CDD mode, respectively. It can be seen that using the SFC-based spatial multiplexing technique can increase the PHY throughput at high SINR values compared to using the CDD-based spatial diversity technique. At low SINR values, however, using the CDD-based spatial diversity technique can result in more robust PHY performance than using the SFC-based spatial multiplexing technique.

Figure 2C:
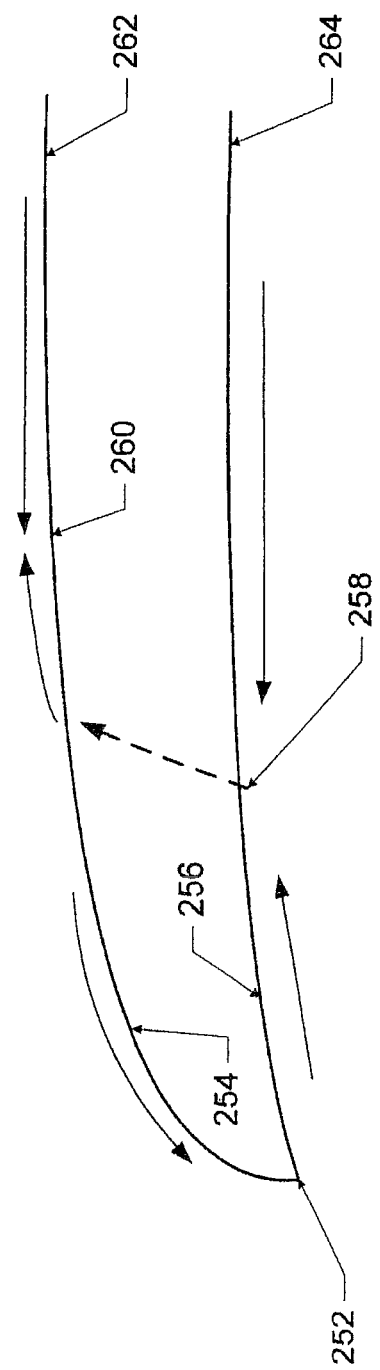

Typically, link adaptation schemes are used to choose an appropriate MCS for a given channel condition (SINR). FIG. 2C shows an example of how a link adaptation scheme may select an optimal MCS. Curve 262 and curve 264 are two example sigmoidal PHY throughput curves as a function of the SINR, with each curve corresponding to a MCS. Point 254 represents the upper knee of curve 262 and point 256 represents the upper knee of curve 264. Point 258 represents the optimal operating point ("OOP") for the MCS corresponding to curve 264; and point 260 represents the OOP for the MCS corresponding to curve 262. Normally, the PHY throughput improvement for a given MCS becomes reduced beyond the upper knee of the sigmoidal curve, and, beyond the OOP, the PHY throughput only improves marginally. An adaptation switching point ("ASP") (e.g., 252) denotes where it can become advantageous to switch to a different MCS.

For example, if the MCS corresponding to curve 262 is first chosen, it may become advantageous to switch to the MCS corresponding to curve 264 at point 252 as the SINR of the transmission channel deteriorates so that more robust data transmission may be achieved by using the MCS corresponding to curve 262. As the SINR of the channel improves, on the other hand, it may become advantageous to switch from the MCS corresponding to curve 264 to the MCS corresponding to curve 262 at OOP 258 of curve 264 so that a higher data transmission rate may be achieved by using the MCS corresponding to curve 262. In one embodiment, the ASP may be the intersection point of the two curves. In another embodiment, the ASP might be the same as the intersection point of the two curves.

Note that the effectiveness of the adaptation may be limited by the rate at which the channel changes depending on the channel coherence and fading time, activity of other devices occupying the same channel, the fastness of the adaptation scheme, the packet sizes, the duration of packet transmissions. The success or failure associated with each transmission in the wireless channel and an indication of the current channel conditions can provide feedback. In addition, with aggregated packet transmissions, the flexibility of the transmission protocol to vary the MCS during transmissions is relevant if channel conditions change drastically while an aggregated packet transmission is in progress. It is desirable to match the speed of the adaptation switching mechanism to the rate at which channel conditions vary, and to match the modulation and coding scheme to the current channel conditions as quickly as possible. Such proactive adaptation may help to ensure that a high probability is obtained for successful transmissions in the wireless channel, and to reduce the overhead of retransmissions in the channel. In addition, as channel conditions improve, it is desirable to take advantage of improvement in channel conditions to get increased overall throughput, by using the highest throughput modulation and coding scheme that is possible under the given conditions.

With different options for MCS's, it may be difficult to predict what the approximate PHY throughput might be for a given value of the SINR without looking at all the curves (or look-up tables) and choosing an OOP from all the curves, each corresponding to an MCS. Thus, it would be useful to have an analytic function that would provide a value of the approximate PHY throughput for a given value of the SINR.

Figure 3A:
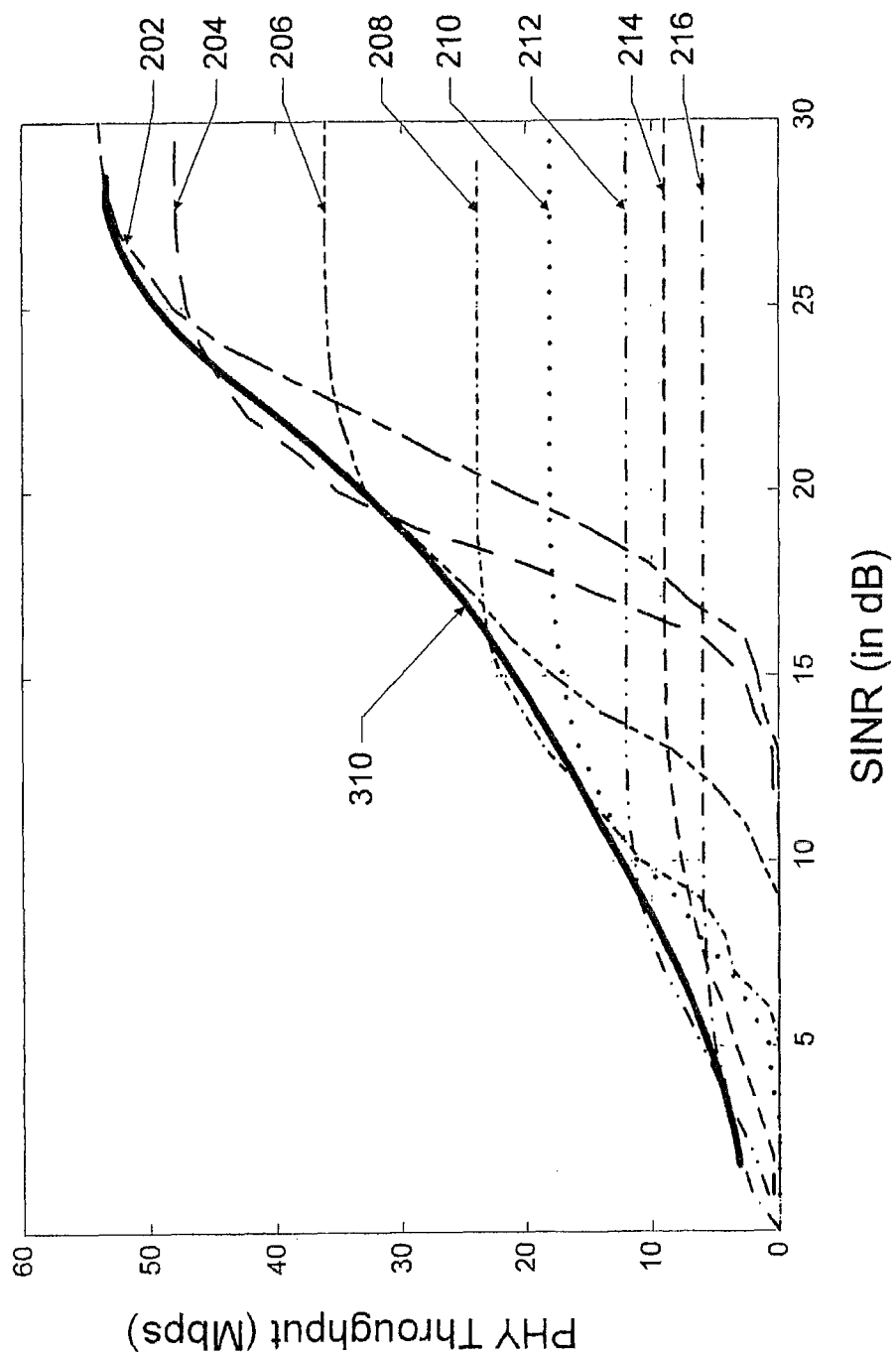
FIGS. 3A-3C show an example of modeling the performance of a network physical layer across different data modulation and coding schemes.
Figure 3B:
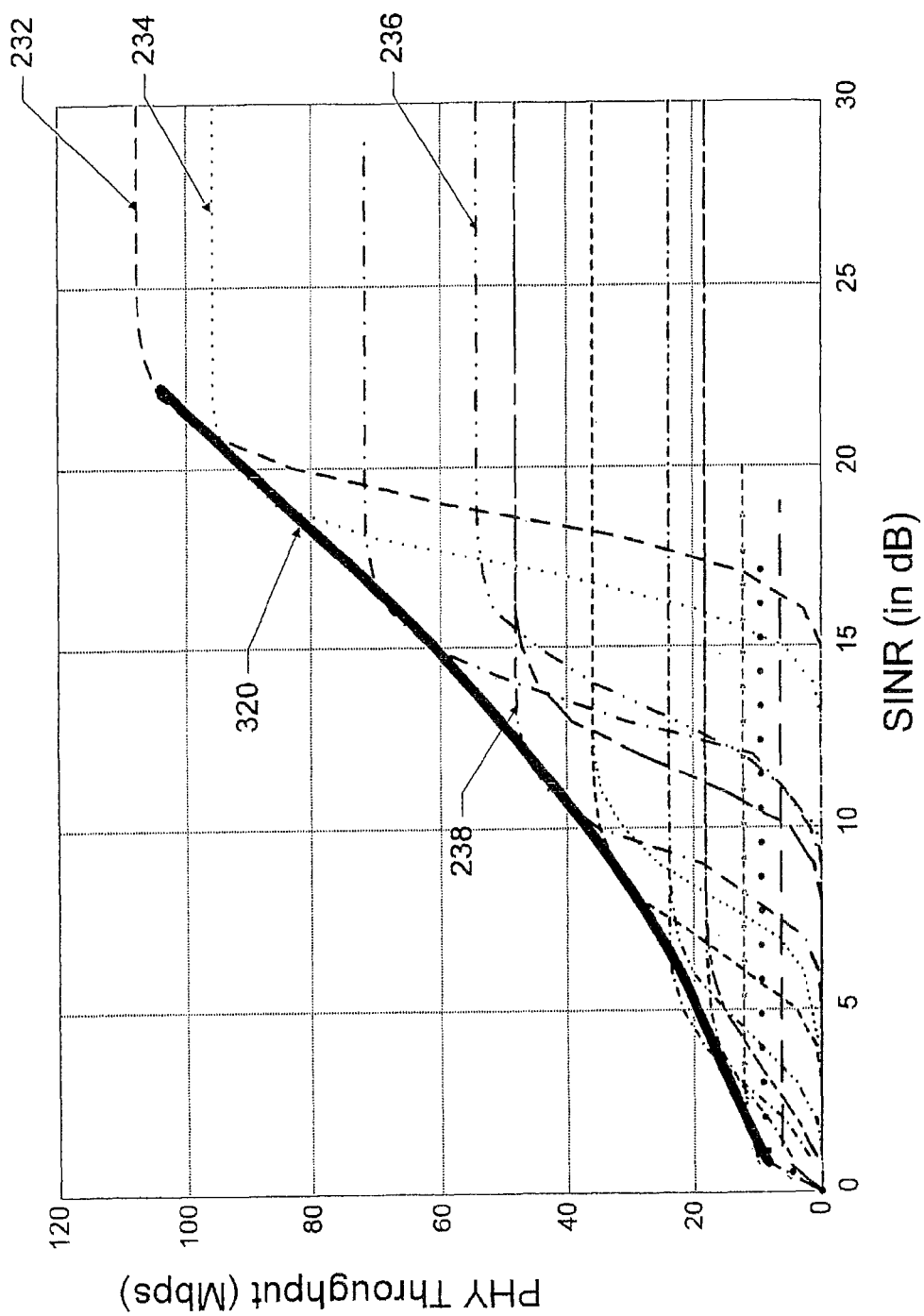

Although the upper knee of a PHY sigmoidal curve is to the left of the OOP, the PHY throughput improvement from the upper knee to the OOP is typically not very significant. Additionally, it may be desirable for a link adaptation scheme to adapt and operate in a region close to the upper knee of a sigmoidal PHY throughput curve because other factors (such as channel fading conditions and channel coherence time) may also affect the performance of an MCS so that the MCS might not be able to operate at the OOP at a given SINR. It is found that although there may be a myriad of available MCS's a physical layer may use, a sigmoidal envelope may be formed by the upper knees of sigmoidal PHY throughput curves corresponding to these MCS's. FIG. 3A shows that a sigmoidal envelope 310 may be obtained for curves shown in FIG. 2A and FIG. 3B shows that a sigmoidal envelope 320 may be obtained for curves shown in FIG. 2B. A sigmoidal envelope thus obtained provides an abstraction of the PHY performance under different MCS's and may thus be used to model the PHY throughput as a function of the SINR. The sigmoidal envelope may be used by higher layers in the communication network so that these layers do not need information about the specific MCS being currently used by the physical layer.

Consider a sigmoidal envelope of the form:

$$L(x) = B/(1 + e^{-\mu(x-\eta)}),\qquad(4)$$

where B is the maximum throughput available for all the available MCS's. The sigmoid envelope has asymptotes $L(x)=B$, and $L(x)=0$, and has an inflection point at $x=\eta$. The factors $\mu$ and B determine the maximum slope ($B\mu/4$) of the sigmoid curve at $x=\eta$. Parameter $\eta$ may be determined by finding the inflection point of the sigmoid envelope (this point divides the envelope into two similar halves). Parameter $\mu$ may be determined by calculating the slope of the sigmoid envelope at the inflection point.

It is possible that a value in a sigmoidal envelope lies between the optimal values for two different MCS's. In such a case, the value is approximate, but it may still be a fair representation of the expected PHY throughput since based on variations in channel conditions, the actual performance of a chosen MCS may vary between the two available options to the link adaptation scheme in the system.

In FIGS. 3A and 3B, sigmoidal envelopes are obtained for packet sizes of 1000 bytes and with a 75 ns exponentially fading channel. In practice, a communication network, especially a wireless communication network, may have variations in the sizes of the packets being transmitted and with respect to the channel fading condition as well. For a range of variations in channel conditions and packet sizes in a communication network, one can expect that the performance of the network would lie in between two sigmoidal envelopes, each representing an extreme set of choices of such parameters that characterize the network. Assume that these sigmoidal envelopes are $L_1(x)$ and $L_2(x)$ characterized by the parameters $(B_1, \mu_1, \eta_1)$ and $(B_2, \mu_2, \eta_2)$, respectively. In one embodiment, both sigmoidal envelopes may have the same asymptotic value B, but the parameters $\mu$ and $\eta$ may vary. With these two sigmoidal envelopes, for a given value of the SINR x, an estimate of the PHY throughput may fall in the range between the throughputs suggested by $L_1(x)$ and $L_2(x)$.

Figure 3C:
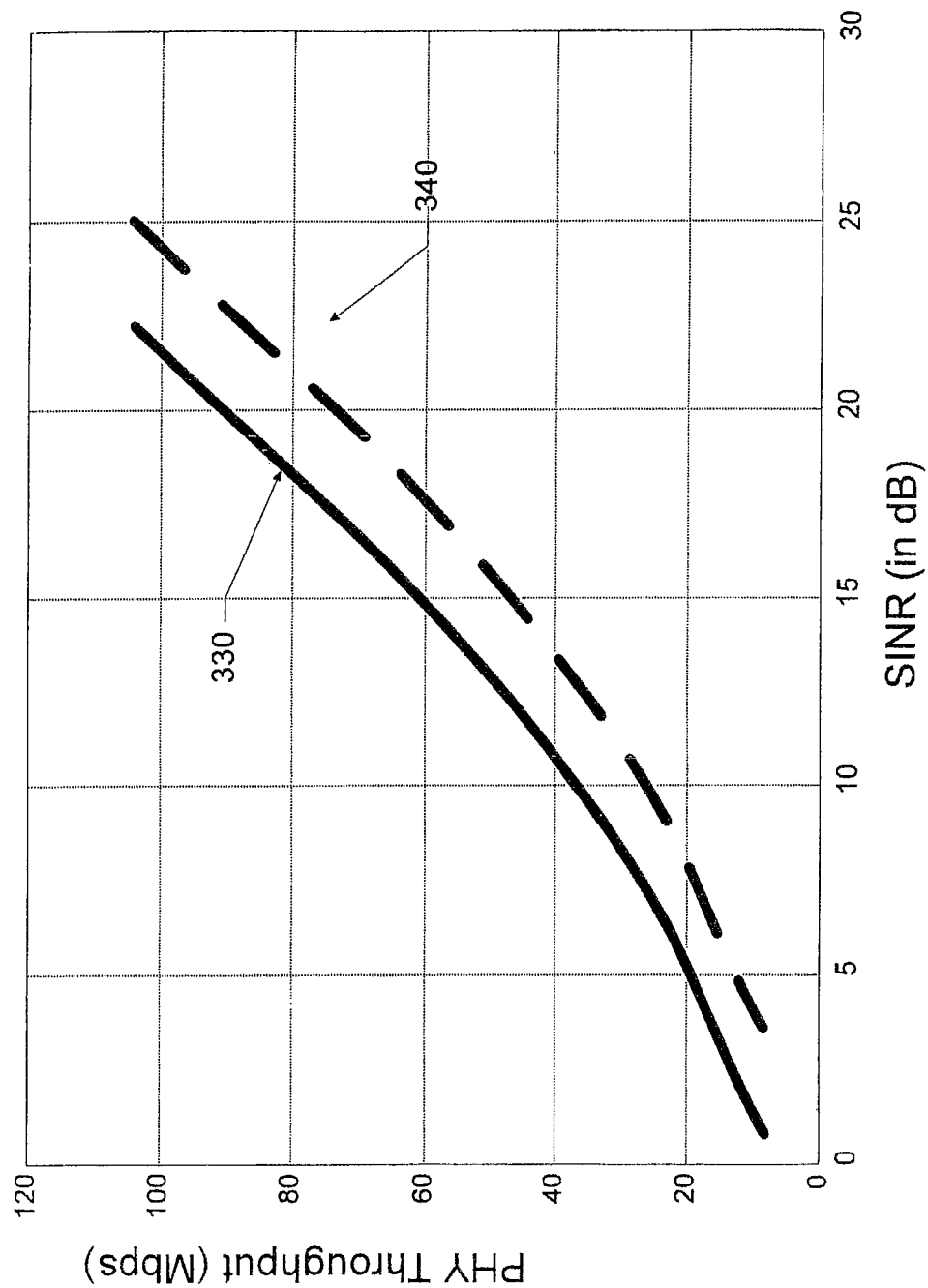

FIG. 3C shows an example of how two sigmoidal envelopes 330 and 340 may be used to model the PHY performance of a communication network. For a given value of SINR (e.g., 15 dB), sigmoidal envelope 330 provides a PHY throughput value of approximately 60 Mbps and sigmoidal envelope 340 provides another value of approximately 36 Mbps. Thus, an estimate of the PHY throughput may be in the range between 36 Mbps and 60 Mbps. Higher layers in the communication network may use this range of PHY throughput to adjust their own expected performance.

The effective wireless link throughput above the PHY ("WLT") is given by $$\begin{aligned}WLT &= U*(1-P_e)*(L/(T_{au}+(L+L_h)/A)),\qquad(5)\\ &= U*(1-P_e)*A*(N/(A*T_{au}+N+N_h)),\\ &= U*L(x)*(N/(A*T_{au}+N+N_h));\end{aligned}$$

where U is wireless link utilization by the user (such as 40%=0.4); N is the average payload data length in bits (such as 1500 bytes); $N_h$ is the overhead of headers in bits; $T_{au}$ is the latency overhead including backoff time, inter-frame spacing, ACK time, RTS/CTS, and/or other link adaptation overhead; A is the PHY throughput corresponding to MCS scheme being used (such as 54 Mbps, 36 Mbps, etc.); $P_e$ is the PHY packet error rate (such as 2%=0.02); L(x) is the PHY throughput from the sigmoid envelope; and x is SINR. This effective throughput may capture the additional overheads inherent in the wireless transmission protocol such as channel backoff time, inter-frame spacing, overheads of other users involved in transmission, packet header overheads, and the availability of the link in the presence of other users that share the same channel for wireless transmissions.

Figure 4:
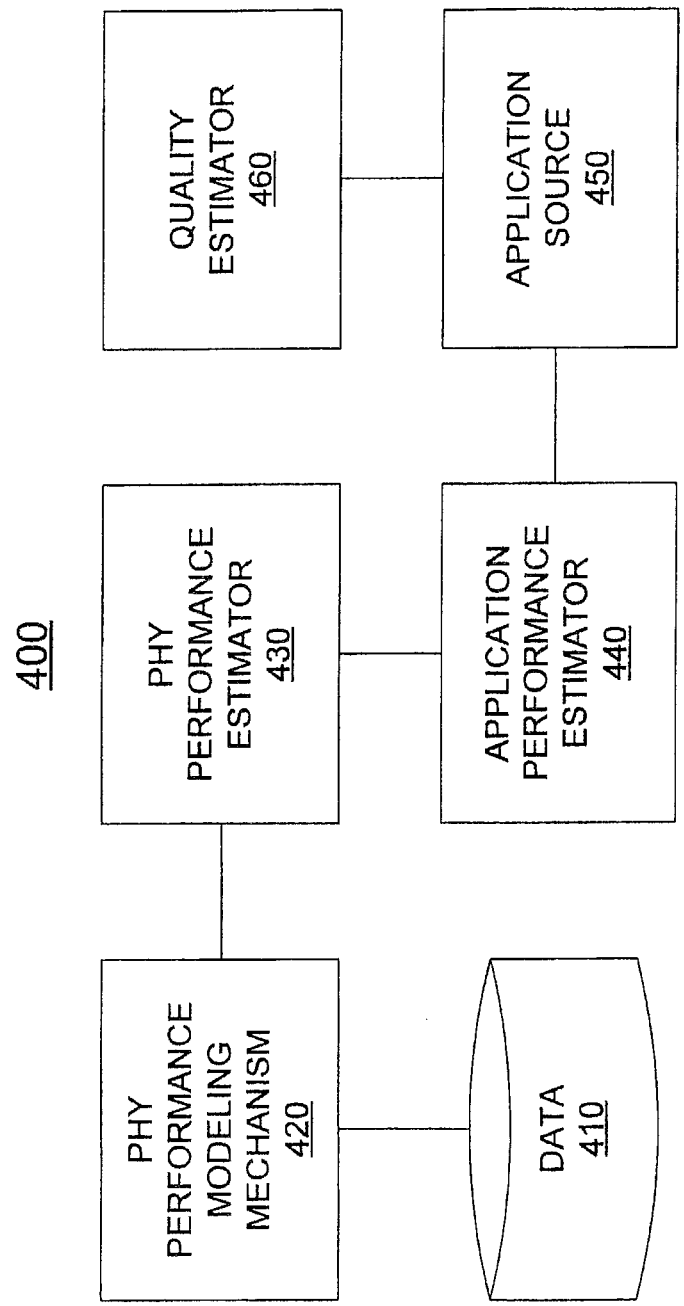
FIG. 4 shows one example system, that models and predicts the system performance of a communication network.

FIG. 4 shows one example system 400 that models and predicts the system performance of a communication network. System 400 comprises a PHY performance modeling mechanism 420, a PHY performance estimator 430, an application performance estimator 440, and a quality estimator 460. PHY performance modeling mechanism 420 uses one or two sigmoid functions (e.g., the sigmoid function shown in Equation (4)) to model the PHY throughput as a function of the channel condition such as SINR for all of the MCS's available to the physical layer. The PHY performance modeling mechanism receives PHY performance data 410 for each of the available MCS's. The PHY performance data for each MCS includes a sigmoidal relationship between the PHY throughput and the channel SINR. A sigmoid function used to model the PHY performance across different MCS's ("PHY performance modeling sigmoid function") reflects the envelope of PHY throughput curves for all of the available MCS's under a certain set of factors including channel conditions (e.g., fading condition and coherence time) and packet size.

The parameters of the PHY performance modeling sigmoid function may be determined from PHY performance data 410 and the envelope curve formed by PHY throughput curves, each of which corresponds to an available MCS. For example, parameter B in Equation (4) is the maximum possible throughput for all of the available MCS's. Parameter η may be determined by finding the inflection point of the sigmoid envelope. Parameter p may be determined by calculating the slope (B×μ/4) of the sigmoid envelope at the inflection point. In some cases, the PHY performance modeling mechanism may use two sigmoid functions to model the PHY performance for all of the available MCS's: one corresponding to a set of factors under the worst situation and the other corresponding to a set of factors under the best situation. The actual PHY performance at a given SINR may fall in a range defined by values obtained from the two PHY performance modeling sigmoid functions.

PHY performance estimator 430 estimates the performance of the physical layer (e.g., the PHY throughput) for a given channel condition (e.g., SINR) based on the PHY performance modeling sigmoid function(s). When there is only one such sigmoid function, only one estimated value of the PHY performance in terms of throughput may be obtained. When there are two such sigmoid functions, two estimated values of PHY throughput may be obtained. The actual PHY throughput may fall into the range formed by these two estimated values.

Application performance estimator 440 estimates the performance of the communication network at the application level based on the estimated performance of the physical layer provided by PHY performance estimator 430. To estimate the network performance (e.g., throughput) at the application level based on the PHY performance, protocol and header overheads (in addition to actual data) added by upper layers (e.g., the data link layer, the network layer, the transport layer, the session layer, the presentation layer, and the application layer) need to be considered. Normally overheads added by each layer are fixed and do not change with channel conditions. For example, if the estimated PHY throughput is 50 Mbps and overheads added by layers higher than the physical layer is 5 Mbps, the estimated throughput of the network at the application level should be 45 Mbps. In other words, an application source (e.g., 450) should not prepare a data stream in a bit rate exceeding 45 Mbps because of overheads, even though the estimated PHY throughput is 50 Mbps.

Based on the estimated performance of the network at the application level, an application source 450 may scale accordingly to produce a data stream with a bit rate less than or equal to the estimated throughput of the network at the application level. Based on the data stream so produced, quality estimator 460 may estimate the quality of information (e.g., a video clip) that can be achieved at a receiving agent. In case the transmission channel condition (e.g. SINR) is not good enough to transmit data at a bit rate to achieve a desirable quality at a receiving agent, the application source may decide to wait to transmit the data until the channel condition improves or to use an alternative channel if possible.

Figure 5:
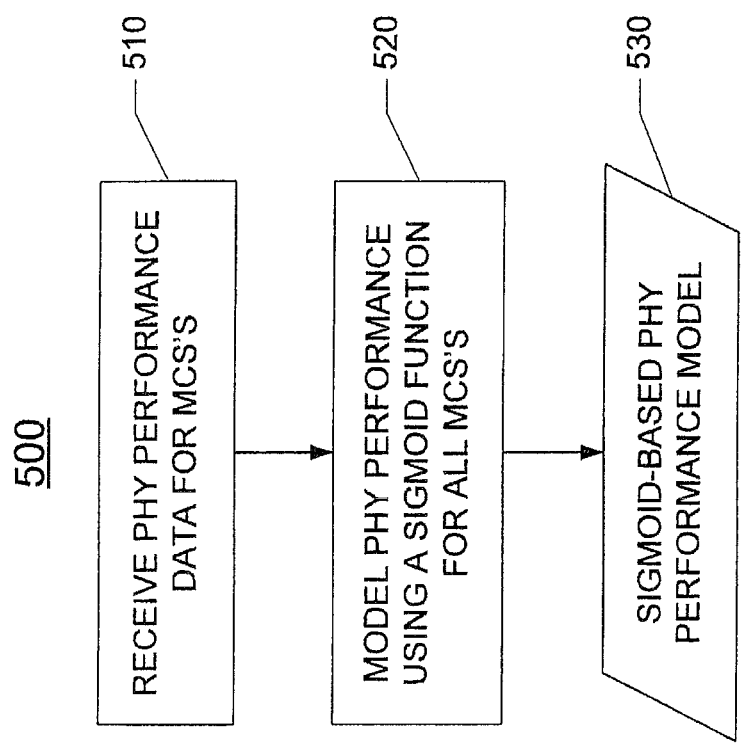
FIG. 5 illustrates a flowchart of one example process for modeling the performance of a network physical layer across different data modulation and coding schemes.

FIG. 5 illustrates a flowchart of one example process 500 for modeling the performance of a network PHY across different MCS's available to the physical layer. At block 510, PHY performance data for each of the available MCS's may be received. The PHY performance data for each MCS includes a sigmoidal relationship between the PHY throughput and the channel SINR. At block 520, the PHY performance for all the available MCS's may be modeled using one or two sigmoid functions. A PHY performance modeling sigmoid function reflects the envelope of PHY throughput curves for all of the available MCS's under a certain set of factors including channel conditions (e.g., fading condition and coherence time) and packet size.

In some cases, two sigmoid functions may be used to model the PHY performance for all of the available MCS's: one corresponding to a set of factors under the worst situation and the other corresponding to a set of factors under the best situation. The actual PHY performance at a given SINR may fall in a range defined by values obtained from the two PHY performance modeling sigmoid functions. At block 530 a sigmoid-based PHY performance model may be obtained. The model may include one or two sigmoid functions. Each function is defined by three parameters (e.g., B, η, and μ as shown in Equation (4)), which may be determined from the PHY performance data received at block 510, as described in association with FIG. 4.

Figure 6:
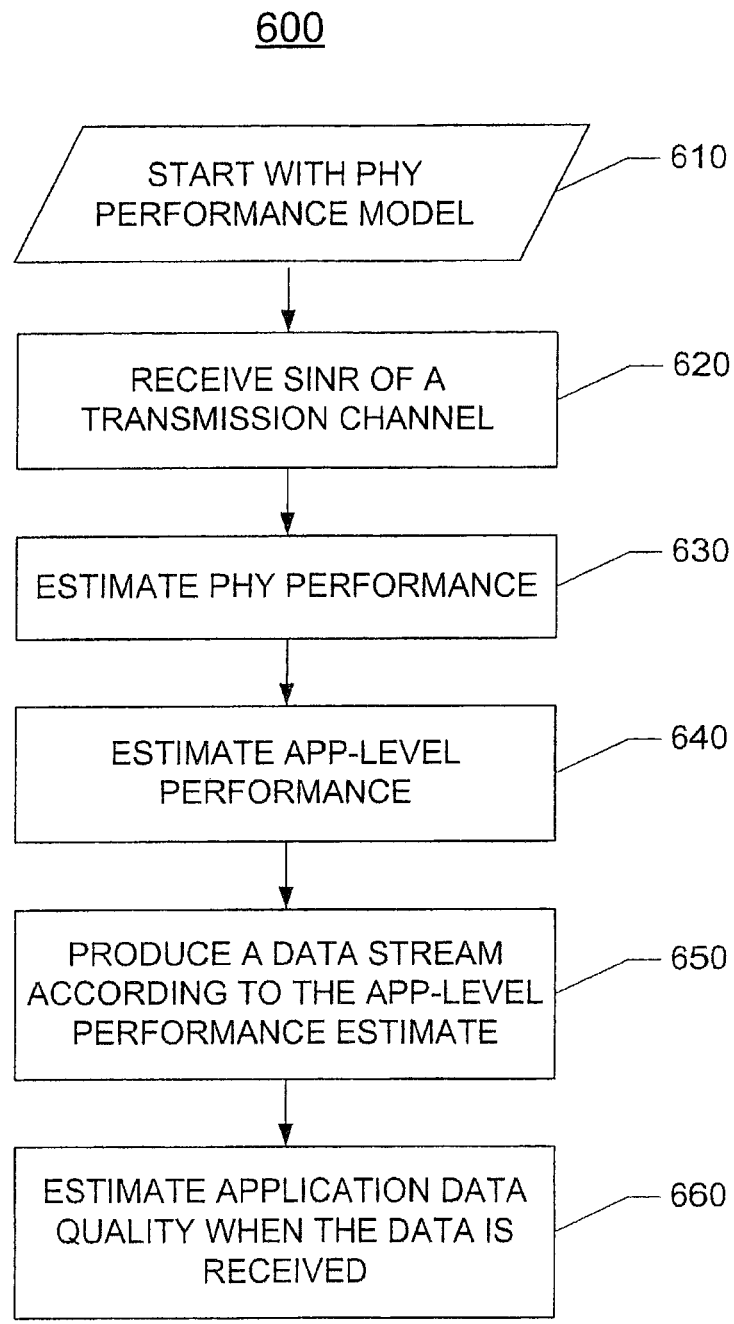
FIG. 6 illustrates a flowchart of one example process for modeling and predicting the performance of a communication network for a particular application.

FIG. 6 illustrates a flowchart of one example process 600 for modeling and predicting the performance of a communication network for a particular application. Process 600 starts with PHY performance model at block 610. The PHY performance model may be obtained through the process as illustrated in FIG. 5. At block 620, a SINR value of a transmission channel may be received. At block 630, the PHY performance (e.g., PHY throughput) for the SINR received at block 620 may be estimated based on the PHY performance model. At block 640, the network performance at the application level may be estimated based on the estimated PHY performance by considering overheads added by network layers higher than the physical layer. At block 650, a data stream may be produced at a bit rate less than or equal to the estimated throughput of the network at the application level. At block 660, the quality of information to be transmitted at such a bit rate, when received by a receiving agent, may be estimated. The result of the estimated quality of information, when received, may be used to make a decision regarding when the information should be transmitted immediately using the target channel or whether an alternative channel should be used.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:

modeling a performance of a physical layer of a network for a plurality of data modulation and coding schemes for a particular application program running on a computer and communicating data over the physical layer of the network, the computer including a processor, wherein the computer is in communication with the network, wherein said modeling comprises:

receiving performance data of said physical layer for said plurality of data modulation and coding schemes, wherein said performance data comprises a plurality of performance curves, wherein the plurality of performance curves comprises a plurality of sigmoidal curves, each of said plurality of sigmoidal curves representing a sigmoidal relationship between the throughput of said physical layer and a condition of a data transmission channel used by said physical layer for each of said plurality of data modulation and coding schemes, wherein said condition comprises a signal to interference plus noise ratio ("SINR") of said data transmission channel, and modeling the plurality of performance curves using a single sigmoid function to approximate an envelope formed by upper knees of said plurality of sigmoidal curves, and adapting said single sigmoid function to changing conditions of said data transmission channel; and predicting the performance of said network for the particular application program based at least in part on the single sigmoid function based performance model of said physical layer by the processor.

2. The method of claim 1, wherein predicting the performance of said network for an application comprises:

receiving the SINR of said data transmission channel used by said physical layer; and estimating the performance of said physical layer under said SINR based on said single sigmoid function based performance model of said physical layer.

3. The method of claim 2, wherein predicting the performance of said network for an application further comprises:

estimating the performance of an application layer of said network based at least in part on said estimated performance of said physical layer under said SINR; and producing a data stream for transmitting said data required by said application at a rate according to the estimated application layer performance.

4. The method of claim 3, wherein predicting the performance of said network for an application further comprises estimating the quality of said data required by said application, when received, based on said data stream.

5. The method of claim 3, wherein estimating the performance of an application layer of said network comprises taking into account overheads added to said data required by said application by network layers higher than said physical layer.

6. A method comprising:

receiving performance data of a physical layer in a network for a plurality of data modulation and coding schemes for a particular application program running on a computer, wherein said performance data includes a plurality of sigmoidal curves for each of said plurality of data modulation and coding schemes, each of said plurality of sigmoidal curves representing a sigmoidal relationship between the throughput of said physical layer and a condition of a data transmission channel used by said physical layer for the corresponding one of said plurality of data modulation and coding schemes, wherein said performance data of said physical layer for a plurality of data modulation and coding schemes comprises the condition of the data transmission channel used by said physical layer for each of said plurality of data modulation and coding schemes, wherein said condition comprises a signal to interference plus noise ratio ("SINR") of said data transmission channel; and abstracting said performance data comprising modeling said plurality of sigmoidal curves using a single sigmoid function to approximate an envelope formed by upper knees of said plurality of sigmoidal curves, and adapting said single sigmoid function to changing conditions of said data transmission channel to model the performance of the particular application program communicating data over the physical layer of the network by a processor in communication with the network.

7. The method of claim 6, wherein abstracting said performance data further comprises obtaining parameters of said sigmoid function based at least in part on said envelope.

8. An apparatus comprising:

a physical layer (PHY) performance modeling mechanism configured to:

receive performance data of said physical layer for a plurality of data modulation and coding schemes, wherein said performance data comprises a plurality of performance curves, wherein said plurality of performance curves comprises a plurality of sigmoidal curves, each of said plurality of sigmoidal curves representing a sigmoidal relationship between the throughput of said physical layer and a condition of a data transmission channel used by said physical layer for each of said plurality of data modulation and coding schemes, wherein said condition comprises a signal to interference plus noise ratio ("SINR") of said data transmission channel, and model the performance for a particular application program running on a computer and communicating data over said physical layer based on modeling the plurality of performance curves by using a single sigmoid function to approximate an envelope formed by upper knees of said plurality of sigmoidal curves, and adapting said single sigmoid function to changing conditions of said data transmission channel; and a quality estimator configured to predict the performance of said network for the particular application program based at least in part on the obtained single sigmoid function based performance model of said physical layer.

9. The apparatus of claim 8, further comprising a PHY performance estimator to receive the SINR of said data transmission channel used by said physical layer, and to estimate the performance of said physical layer under said SINR based on said sigmoid function based performance model of said physical layer.

10. The apparatus of claim 9, further comprising an application performance estimator to estimate the performance of an application layer of said network based at least in part on said estimated performance of said physical layer under said SINR, and to produce a data stream for transmitting said data required by said application at a rate according to the estimated application layer performance.

11. The apparatus of claim 10, wherein said application performance estimator estimates the performance of an application layer of said network by taking into account overheads added to said data required by said application by network layers higher than said physical layer.

12. The apparatus of claim 10, wherein said quality estimator predicts the performance of said network for an application by estimating the quality of said data required by said application, when received, based on said data stream.

13. An article comprising:

a non-transitory machine readable medium that contains instructions, which when executed by a processing platform, cause said processing platform to perform operations comprising:

modeling a performance of a physical layer of a network for a plurality of data modulation and coding schemes for a particular application program running on a computer and communicating data over the physical layer of the network, wherein said modeling comprises:

receiving performance data of said physical layer for said plurality of data modulation and coding schemes, wherein said performance data comprises a plurality of performance curves, wherein the plurality of performance curves comprises a plurality of sigmoidal curves, each of said plurality of sigmoidal curves representing a sigmoidal relationship between the throughput of said physical layer and a condition of a data transmission channel used by said physical layer for each of said plurality of data modulation and coding schemes, wherein said condition comprises a signal to interference plus noise ratio ("SINR") of said data transmission channel, and modeling the plurality of performance curves using a single sigmoid function to approximate an envelope formed by upper knees of said plurality of sigmoidal curves, and adapting said single sigmoid function to changing conditions of said data transmission channel; and predicting the performance of said network for the particular application program based at least in part on the obtained single sigmoid function based performance model of said physical layer.

14. The article of claim 13, wherein said predicting the performance of said network for an application comprises:

receiving the SINR of said data transmission channel used by said physical layer;

estimating the performance of said physical layer under said SINR based on said sigmoid function based performance model of said physical layer;

estimating the performance of an application layer of said network based at least in part on said estimated performance of said physical layer under said SINR;

producing a data stream for transmitting said data required by said application at a rate according to the estimated application layer performance; and estimating the quality of said data required by said application, when received, based on said data stream.

15. A method comprising:

modeling a performance of a physical layer of a network for a plurality of data modulation and coding schemes for a particular application program running on a computer and communicating data over the physical layer of the network, the computer including a processor, wherein the computer is in communication with the network, wherein said modeling includes modeling a combination of a plurality of curves using a sigmoid function, wherein each of the plurality of curves is associated with one of the plurality of data modulation and coding schemes; and predicting the performance of said network for the particular application program based at least in part on the sigmoid function based performance model of said physical layer by the processor, wherein said predicting comprises:

receiving a signal to interference plus noise ratio ("SINR") of a data transmission channel used by said physical layer;

estimating the performance of said physical layer under said SINR based on said sigmoid function based performance model of said physical layer;

estimating the performance of an application layer of said network based at least in part on said estimated performance of said physical layer under said SINR, and taking into account overheads added to said data required by said application by network layers higher than said physical layer; and producing a data stream for transmitting said data required by said application at a rate according to the estimated application layer performance.

16. An apparatus comprising:

a physical layer (PHY) performance modeling mechanism to model the performance for a particular application program running on a computer and communicating data over a physical layer of a network for a plurality of data modulation and coding schemes based on modeling a combination of a plurality of curves using a single sigmoid function, wherein each of the plurality of curves is associated with one of the plurality of data modulation and coding schemes;

a quality estimator to predict the performance of said network for the particular application program based at least in part on the obtained sigmoid function based performance model of said physical layer;

a PHY performance estimator to receive a signal to interference plus noise ratio ("SINR") of a data transmission channel used by said physical layer, and to estimate the performance of said physical layer under said SINR based on said sigmoid function based performance model of said physical layer; and an application performance estimator to estimate the performance of an application layer of said network based at least in part on said estimated performance of said physical layer under said SINR and by taking into account overheads added to said data required by said application by network layers higher than said physical layer, and to produce a data stream for transmitting said data required by said application at a rate according to the estimated application layer performance.

17. A method comprising:

modeling a performance of a physical layer of a network for a plurality of data modulation and coding schemes for a particular application program running on a computer and communicating data over the physical layer of the network, the computer including a processor, wherein the computer is in communication with the network, wherein said modeling the performance of the physical player comprises:

representing a plurality of physical layer performance relationships comprising a plurality of sigmoidal curves collectively as a single sigmoid function such that said single sigmoid function approximates an envelope formed by upper knees of said plurality of sigmoidal curves, wherein each of the plurality of physical layer performance relationships indicates a relationship between a throughput of said physical layer and a condition of a data transmission channel used by said physical layer for one of said plurality of data modulation and coding schemes, wherein said condition comprises a signal to interference plus noise ratio ("SINR") of said data transmission channel.

* * * * *

UNITED STATES PATENT AND TRADEMARK OFFICE
CERTIFICATE OF CORRECTION

PATENT NO. : 8,432,849 B2  
APPLICATION NO. : 11/240021  
DATED : April 30, 2013  
INVENTOR(S) : Dilip Krishnaswamy et al.

Page 1 of 1

It is certified that error appears in the above-identified patent and that said Letters Patent is hereby corrected as shown below:

On title page, item (75) Inventors, Line 1
 replace "Krishnasawamy"
 with --Krishnaswamy--.

Signed and Sealed this
Second Day of July, 2013

Teresa Stanek Rea
*Acting Director of the United States Patent and Trademark Office*